(12) United States Patent
Ceccarelli et al.

(10) Patent No.: US 10,397,063 B2
(45) Date of Patent: Aug. 27, 2019

(54) DISCOVERING LINKS BETWEEN OPERATING DOMAINS IN A COMMUNICATION NETWORK

(71) Applicant: Telefonaktiebolaget L M Ericsson (publ), Stockholm (SE)

(72) Inventors: Daniele Ceccarelli, Stockholm (SE); Diego Caviglia, Stockholm (SE); Gianluca Lombardi, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 79 days.

(21) Appl. No.: 14/442,864

(22) PCT Filed: Feb. 12, 2015

(86) PCT No.: PCT/EP2015/052938
§ 371 (c)(1),
(2) Date: May 14, 2015

(87) PCT Pub. No.: WO2016/128051
PCT Pub. Date: Aug. 18, 2016

(65) Prior Publication Data
US 2016/0359676 A1    Dec. 8, 2016

(51) Int. Cl.
*H04L 12/24* (2006.01)
*H04L 12/751* (2013.01)
*H04L 12/805* (2013.01)

(52) U.S. Cl.
CPC ............ *H04L 41/12* (2013.01); *H04L 41/069* (2013.01); *H04L 41/0677* (2013.01); *H04L 45/02* (2013.01); *H04L 47/36* (2013.01)

(58) Field of Classification Search
None
See application file for complete search history.

(56) References Cited

U.S. PATENT DOCUMENTS 7,278,081 B1    10/2007 Blair et al.
2002/0097954 A1    7/2002 Maeno
(Continued)

FOREIGN PATENT DOCUMENTS

WO    2015039695 A1    3/2015

OTHER PUBLICATIONS

Postel, J., "Internet Protocol", STD 5, RFC 791, DOI 10.17487/RFC0791, Sep. 1981.*
(Continued)

*Primary Examiner* — Charles C Jiang
*Assistant Examiner* — Saad Khawar
(74) *Attorney, Agent, or Firm* — Patent Portfolio Builders, PLLC

(57) ABSTRACT

Methods for automatically discovering links between a first node of a first operating domain and a second node of a second operating domain of a communication network are disclosed. The methods may be implemented at the first node, the second node, or a control node. The first and second nodes communicate in-band control messages. These messages are encoded using a size of the packets of the control messages, and provide information about the first node and a first interface used by the first node for sending the control messages. The first and second nodes also communicate link messages with the control node. The link messages comprise information received in the in-band control messages and information about a second interface used by the second node for receiving the in-band control messages.

17 Claims, 15 Drawing Sheets

(56) References Cited

U.S. PATENT DOCUMENTS

| | | | |
|---|---|---|---|
| 2007/0201383 A1 | 8/2007 | Ong et al. | |
| 2008/0025722 A1* | 1/2008 | Gerstel | H04J 14/0256 398/51 |
| 2014/0317406 A1* | 10/2014 | Lewis | H04L 63/0428 713/170 |
| 2015/0003259 A1* | 1/2015 | Gao | H04L 45/18 370/244 |

OTHER PUBLICATIONS

Iternational Telecommunication Union, "Series G: Transmission Systems and Media, Digital Systems and Networks; Digital terminal equipments—General; Series Y: Global Information Infrastructure, Internet protocol aspects and Next-Generation Networks; Internet protocol aspects—Transport; Iterfaces for the optical transport network", ITU-T G.709/Y. 1331, Feb. 1, 2012, pp. 1-238, ITU.

Iternational Telecommunication Union, "Series G: Transmission Systems and Media, Digital Systems and Networks; Digital terminal equipments—Other terminal equipment; Characteristics of optical transport network hierarchy equipment functional blocks", ITU-T G. 798, Dec. 2, 2012, pp. 1-390, ITU.

Pakzad, F., et al., "Efficient Topology Discovery in Software Defined Networks", 2014 8th International Conference on Signal Processing and Communication Systems (ICSPCS), Dec. 15, 2014, pp. 1-8, IEEE.

Mehmet Toy. "Future Directions in Cable networks, Services and Management"; IEEE Press Series on Networks and Services Management; Jan. 9, 2015; pp. 246-340; Cable Networks, Services, and Management, First Edition, Chapter 6; John Wiley & Sons, Inc.; Hoboken NJ.

Lang et al. "Link Management Protocol (LMP)"; Network Working Group, Standard Tracks; Oct. 2005; pp. 1-76; The Internet Society.

Office Action issued in application No. 15704000.7, dated Apr. 9, 2018; 09 pages.

Office Action issued in application No. 15704000.7, dated Dec. 21, 2018; 05 pages.

\* cited by examiner

DISCOVERING LINKS BETWEEN OPERATING DOMAINS IN A COMMUNICATION NETWORK

TECHNICAL FIELD

The present invention relates to methods for automatically discovering links between a first node of a first operating domain and a second node of a second operating domain of a communication network. The invention also relates to a computer program for carrying out methods for automatically discovering links between a first node of a first operating domain and a second node of a second operating domain of a communication network, and to first, second and control nodes in a communication network.

BACKGROUND

Optical Transport Networks (OTNs) provide functionality including transport, multiplexing, switching, and management of optical channels carrying client signals. Packet-optical integration between electrical and optical domains of a communication network is an important challenge in the implementation of optical networking. One option is to implement the packet-optical integration within a Software Defined Network (SDN) environment, with a single SDN controller responsible for discovering and controlling both the packet and optical domains.

Various mechanisms exist to allow auto-discovery of the links internal to the different domains. For example it is possible to have an SDN controller passively listen to the IGP/BGP routing instance of each domain and so learn its topology. There are also mechanisms, such as LLDP or LMP, which enable links connecting different domains, also known as border links, to be discovered. However, these mechanisms are limited to discovering links within the same layer or switching capability.

In a packet-optical environment the end points of border links are the line card of the router in the electrical domain and the client port of the optical transponder in the optical domain. The client ports of the transponder are not able to process any type of packet such as Ethernet frames or IP packets, and these ports are not therefore able to run any protocol to enable link discovery. Auto-discovery of data plane connectivity between routers and optical devices is not therefore possible. The only way to populate a multilayer database of border links is to let the routing protocols populate single layer databases and then manually enter the information regarding the connectivity between layers.

SUMMARY

It is an aim of the present invention to provide a method and apparatus which obviate or reduce at least one or more of the challenges mentioned above.

According to a first aspect of the present invention, there is provided a method of automatically discovering links between a first node of a first operating domain and a second node of a second operating domain of a communication network. The method, performed in the second node, comprises receiving an in-band control message from the first node, the in-band control message being encoded using size of packets of the control message and providing information about the first node and a first interface used by the first node for sending the control message. The method further comprises sending a link message to a control node, the link message comprising information received in the in-band control message and information about a second interface used by the second node for receiving the in-band control message.

According to examples of the invention, the information about the first node may be an identifier of the first node, for example an IP address of the node or any other identifier used within the communication network. In some examples, the link message may further comprise information about the second node, which may be an identifier of the second node.

According to examples of the invention, the first node may comprise a packet client node and the second node may comprise an optical node.

According to examples of the invention, the in-band control message may be received by the second node periodically, and the method may further comprise, if the second node fails to receive the in-band control message, sending a modified link message to the control node, the modified link message indicating failure of the link between the first node and the second node.

According to examples of the invention, failure to receive the in-band control message may comprise not receiving the message within the normal time period. Alternatively, failure to receive the in-band control message may comprise not receiving the in-band control message a predetermined number of times. In some examples, the modified link message may indicate failure of the link between the first node and the second node through the setting of a flag.

According to another aspect of the present invention, there is provided another method of automatically discovering links between a first node of a first operating domain and a second node of a second operating domain of a communication network. The method, performed in the first node, comprises sending an in-band control message to the second node, the in-band control message being encoded using size of packets of the control message and providing information about the first node and a first interface used by the first node for sending the control message.

According to examples of the invention, the method may further comprise receiving a trigger message from a control node, the trigger message instructing the first node to send the in-band control message.

According to examples of the invention, the trigger message may indicate an interface of the first node to be used for sending the in-band control message, and the method may comprise sending the in-band control message to the second node using the indicated interface.

According to examples of the invention, the trigger message may specify a particular interface or a group of interfaces, for example all border interfaces of the first node. The indication of an interface may comprise a specification of an interface by address or may comprise a flag, which may for example be set to indicate all border interfaces should be used.

According to examples of the invention, the method may further comprise sending the in-band control message to the second node periodically. In some examples, the trigger message may contain an instruction that the in-band control message should be sent periodically.

According to another example of the present invention, there is provided another method of automatically discovering links between a first node of a first operating domain and a second node of a second operating domain of a communication network. The method, performed in a control node, comprises receiving a link message from the second node, the link message comprising information about the first node and a first interface used by the first node for sending an in-band control message to the second node, and information about a second interface used by the second node for receiving the in-band control message.

In some examples of the invention, the control node may comprise an SDN controller.

According to examples of the invention, the method may further comprise updating a link record with the link between the first interface of the first node and the second interface of the second node.

According to examples of the invention, the method may further comprise sending a trigger message to the first node, the trigger message instructing the first node to send the in-band control message.

In some examples, the trigger message may be sent in response to a predetermined event or may be sent periodically. For example, the trigger message may be sent on network setup or following changes to the network topology. The trigger message may also be sent following indication of a link failure.

According to examples of the invention, the trigger message may indicate an interface of the first node to be used for sending the in-band control message.

According to examples of the invention, the trigger message may specify a particular interface or a group of interfaces, for example all border interfaces of the first node. The indication of an interface may comprise a specification of an interface by address or may comprise a flag, which may for example be set to indicate all border interfaces should be used.

According to examples of the invention, the trigger message may instruct the first node to send the in-band control message periodically.

According to examples of the invention, the method may further comprise checking for receipt from a second node of a link message corresponding to the trigger message, and, on failure to receive from the second node a link message corresponding to the trigger message, resending the trigger message.

In some examples, the method may comprise checking for receipt from a second node of a link message including information about a first interface, and, on failure to receive the link message, resending a trigger message specifying the first interface.

According to examples of the invention, the method may further comprise, on failure to receive a link message from the second node corresponding to the re-sent trigger message, updating a link record with failure of the link between the first node and the second node corresponding to the re-sent trigger message.

According to examples of the invention, the method may further comprise receiving a modified link message from the second node, the modified link message indicating failure of the link between the first node and the second node.

According to examples of the invention, the method may further comprise updating a link record with failure of the link between the first node and the second node.

According to another aspect of the present invention, there is provided a computer program configured, when run on a computer, to carry out a method according to any of the preceding aspects of the present invention.

According to another aspect of the present invention, there is provided a computer program product comprising computer readable media having stored thereon a computer program as specified above.

According to another aspect of the present invention, there is provided a control node configured to automatically discover links between a first node of a first operating domain and a second node of a second operating domain of a communication network, the control node comprising a processor and a memory, the memory containing instructions executable by the processor, such that the control node is configured to carry out a method according to the third aspect of the present invention.

According to another aspect of the present invention, there is provided a first node for a first operating domain of a communication network and configured to automatically discover links between the first node and a second node of a second operating domain of the communication network, the first node comprising a processor and a memory, the memory containing instructions executable by the processor, such that the first node is configured to carry out a method according to the second aspect of the present invention.

According to another aspect of the present invention, there is provided a second node for a second operating domain of a communication network and configured to automatically discover links between the second node and a first node of a first operating domain of the communication network, the second node comprising a processor and a memory, the memory containing instructions executable by the processor, such that the second node is configured to carry out a method according to the first aspect of the present invention.

According to another aspect of the present invention, there is provided a control node configured to automatically discover links between a first node of a first operating domain and a second node of a second operating domain of a communication network. The control node comprises a receiving unit configured to receive a link message from the second node, the link message comprising information about the first node and a first interface used by the first node for sending an in-band control message to the second node, and information about a second interface used by the second node for receiving the in-band control message.

According to another aspect of the present invention, there is provided a first node for a first operating domain of a communication network, configured to automatically discover links between the first node and a second node of a second operating domain of the communication network. The first node comprises a transmitting unit configured to send an in-band control message to the second node, the in-band control message being encoded using size of packets of the control message and providing information about the first node and a first interface used by the first node for sending the control message.

According to another aspect of the present invention, there is provided a second node for a second operating domain of a communication network, configured to automatically discover links between the second node and a first node of a first operating domain of the communication network. The second node comprises a receiving unit configured to receive an in-band control message from the first node, the in-band control message being encoded using size of packets of the control message and providing information about the first node and a first interface used by the first node for sending the control message, and a transmitting unit configured to send a link message to a control node, the link message comprising information received in the in-band control message and information about a second interface used by the second node for receiving the in-band control message.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention use an in-band control channel of a communication network to exchange information between a first node of a first domain and a second node of a second domain of a communication network. This exchange enables the running of an auto-discovery protocol between the nodes, allowing border link connectivity and characteristics to be advertised to a control node such as an SDN controller.

Figure 1:
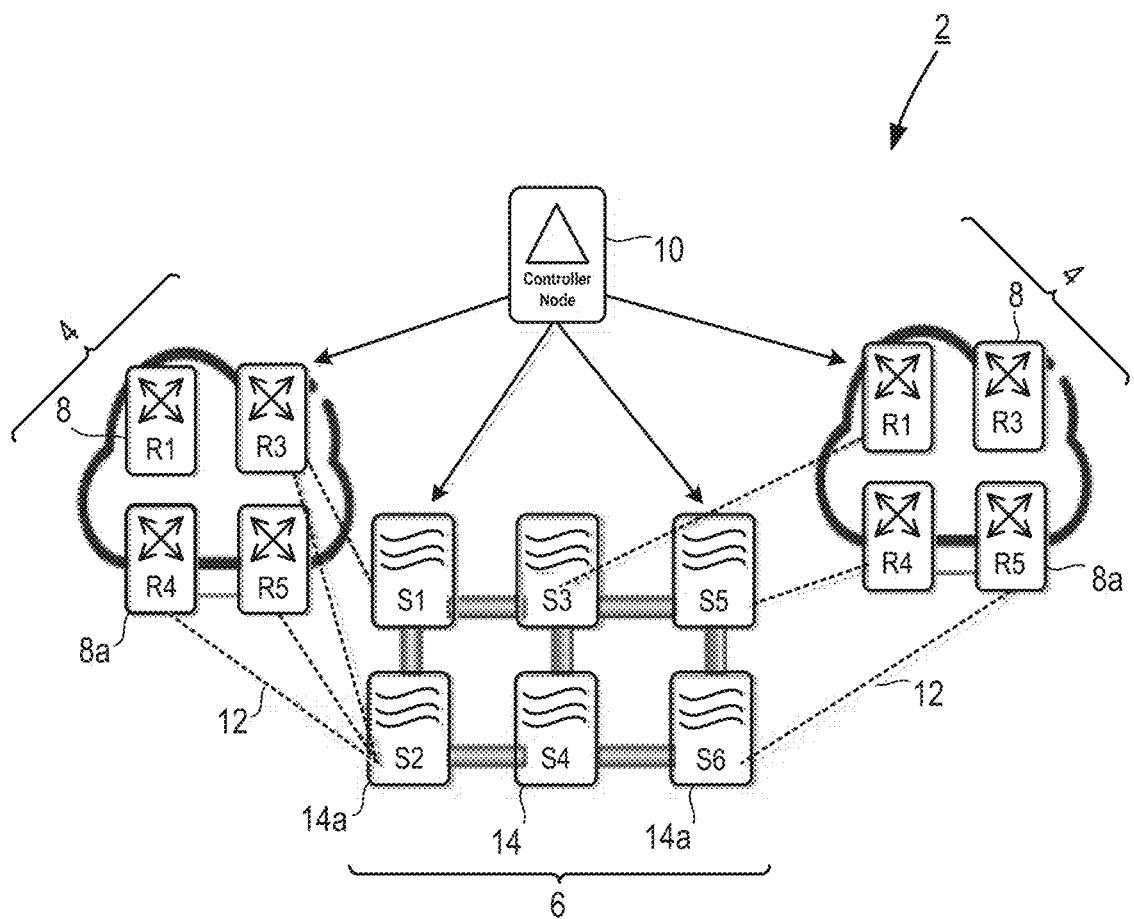
FIG. 1 is a representation of a communication network.

Examples of the invention implement a new protocol, referred to as a Multi Layer-Border Link Discovery Protocol (ML-BLDP), which runs between a control node such as an SDN controller and first and second nodes in first and second domains of a communication network. The first node may for example be a border router in a packet domain and the second node may be a border optical node in an optical domain, where no packet processing takes place. This network scenario is illustrated in FIG. 1, in which a communication network 2 is illustrated. The communication network 2 comprises a first domain 4 and a second domain 6. Integration between the first and second domains is implemented via an SDN controller 10. The first domain 4 is a packet domain comprising a plurality of routers 8, some of which are border routers 8a having links 12 with border elements in the second domain 6. The second domain 6 comprises a plurality of server domains 14, including border server domains 14a. The second domain may implement a range of different technologies, in particular transport technologies such OTN, SDN, WDM etc. In the following discussion, the example of WDM technology is used, and the server domains are thus referred to as Reconfigurable Optical Add Drop Multiplexers (ROADMs), but it will be appreciated that this is merely for the purposes or explanation, and the server domains may comprise other types of nodes. The ROADMs 14, 14a are unable to process packets, and hence no protocol can be run between the routers 8a and ROADMs 14a to enable auto-discovery of border links.

Examples of the present invention make use of methods disclosed in PCT/EP2013/069571 for creating an in-band control channel between nodes of a communication network based upon the dimensions of dummy packets. Methods according to the present invention exploit the in-band control channel to send light messages between nodes over which it is not possible to run any complex routing protocol owing to the inability of at least one of the nodes to process packets. A full explanation of the method for creating an in-band control channel between nodes of a communication network is provided in PCT/EP2013/069571, however a short summary is provided below for the purposes of illustration, using the example of communication between a border router and an optical node.

Figure 2:
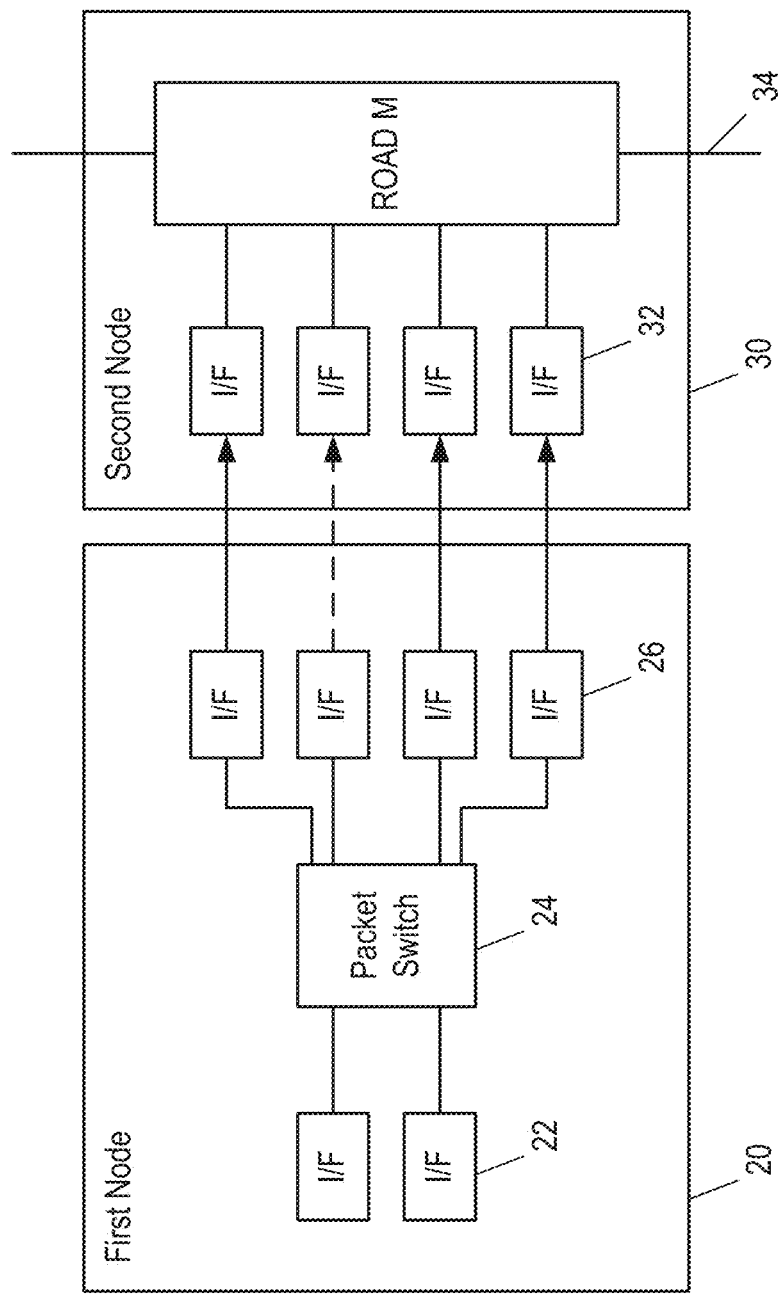
FIG. 2 illustrates functional units in a router node.

FIG. 2 illustrates a first node in the form of a router 20 and a second node in the form of an optical node 30. The router 20 comprises input interfaces 22 connected to a packet switch 24. The packet switch 24 is connected to a plurality of output interfaces 26. In the example of FIG. 2, at least one of the plurality of output interfaces 26 is in direct communication with at least one of a plurality of input interfaces 32 of the optical node 30. The input interfaces 32 are connected to corresponding input interfaces of a ROADM output 34.

According to the method for creating an in-band control channel, the optical node 30 is adapted to comprise a receiver, a decoder and a controller. In a control mode of operation, the receiver is configured to receive a plurality of dummy packets, each dummy packet having one of a plurality of different predetermined lengths, and the sequence of the dummy packets defining a code corresponding to at least one control command. The decoder is configured to check the length of each received dummy packet and to decode at least one control command based on the sequence of lengths of the received dummy packets. The controller is configured to control operation of the optical node 30 in accordance with the at least one decoded control command.

The router 20 is similarly adapted such that a transmitter is configured to transmit a plurality of dummy packets to the optical node 30, each dummy packet having one of a plurality of different predetermined lengths and the sequence of the dummy packets defining a code corresponding to at least one control command for the optical node 30.

In the above described manner, an in-band control channel is created for a communication network in which the nodes have limited capability for inspecting the payload of received packets. The communication between router nodes and optical nodes is established mixing control plane communication into the data plane and relying on the optical node's capability to recognise packet length without requiring the optical node to process received packets. Further detail of the method for establishing an in-band control channel between nodes in a communication network may be found in PCT/EP2013/069571.

The methods of the present invention make use of the above described in-band control channel to send messages of the new ML-BLDP protocol from a first node to a second node. An example overview of the ML-BLDP protocol messages and procedures is given below with reference to the network scenario of FIG. 1 and FIGS. 3 to 10.

Figure 3:
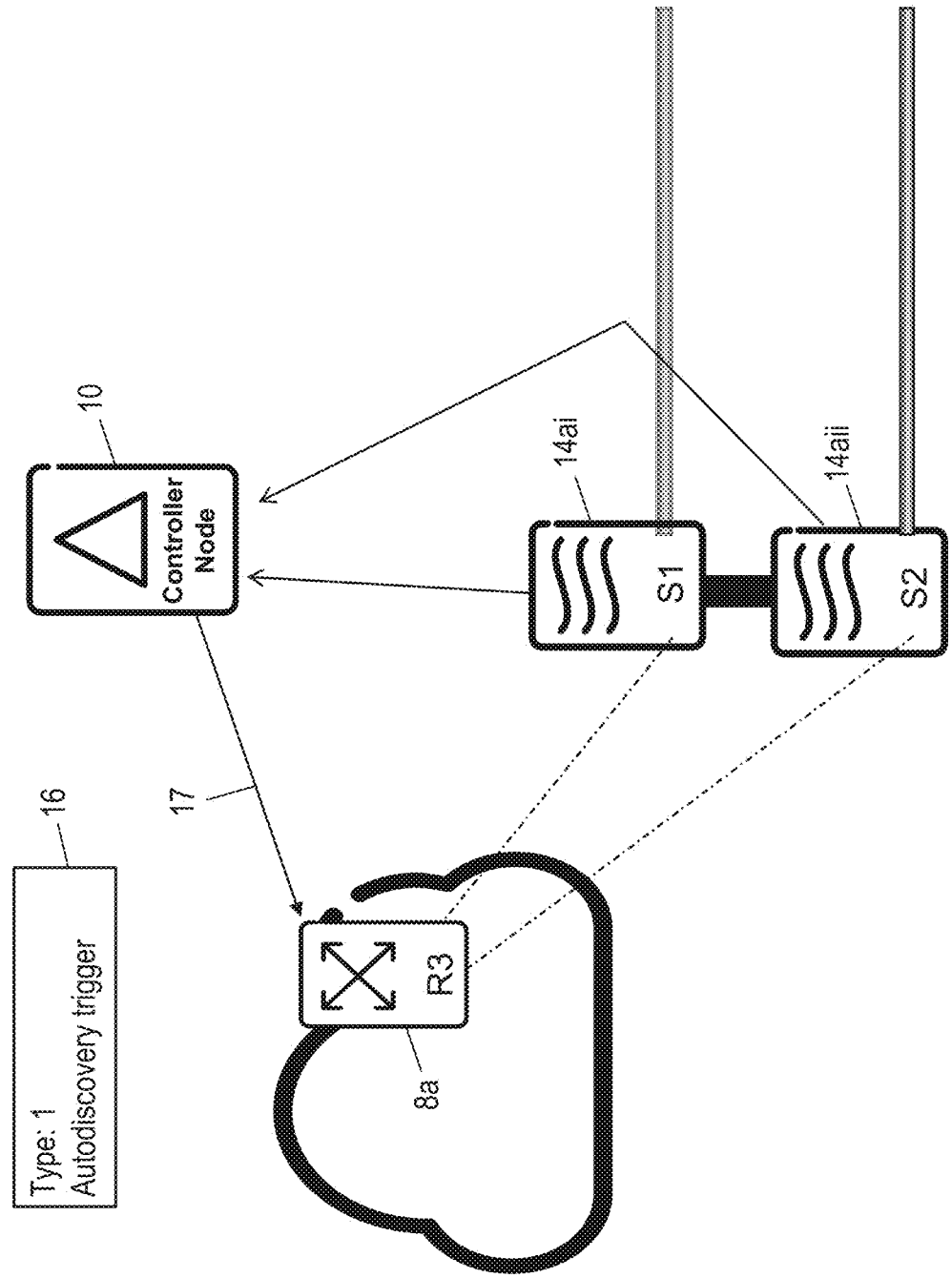
FIG. 3 illustrates a message exchange according to an example method for discovering border links.

Referring to FIG. 3, the SDN controller 10 triggers the auto-discovery of border links by sending a trigger message 16, also referred to as an ML-BLDP Type 1 message 16, to a border router 8a over a control channel 17 between the SDN controller 10 and router 8a. In the illustrated example, the border router 8a is router R3, which has border links with border ROADMs S1 and S2, 14ai and 14aii. The trigger message 16 indicates to which border interfaces of the router R3 the trigger message applies. In one example a flag may be used to assist with this indication, such that when the flag is set, the trigger message applies to a specific border interface, and when the flag is cleared, the trigger message applies to all border interfaces of the router receiving the trigger message.

Figure 4A:
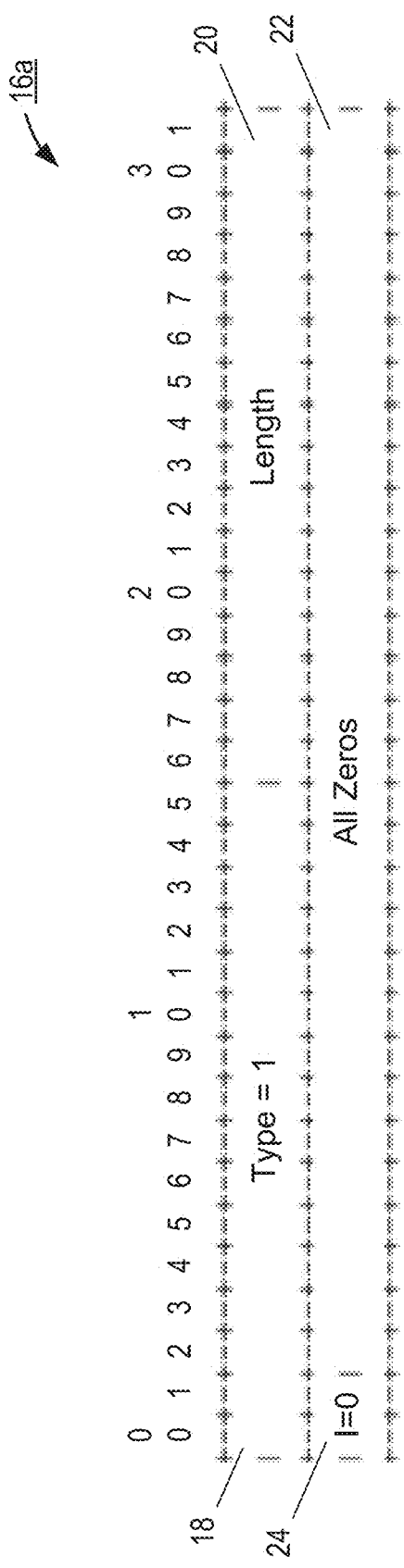
FIGS. 4a and 4b illustrate example message formats.
Figure 4B:
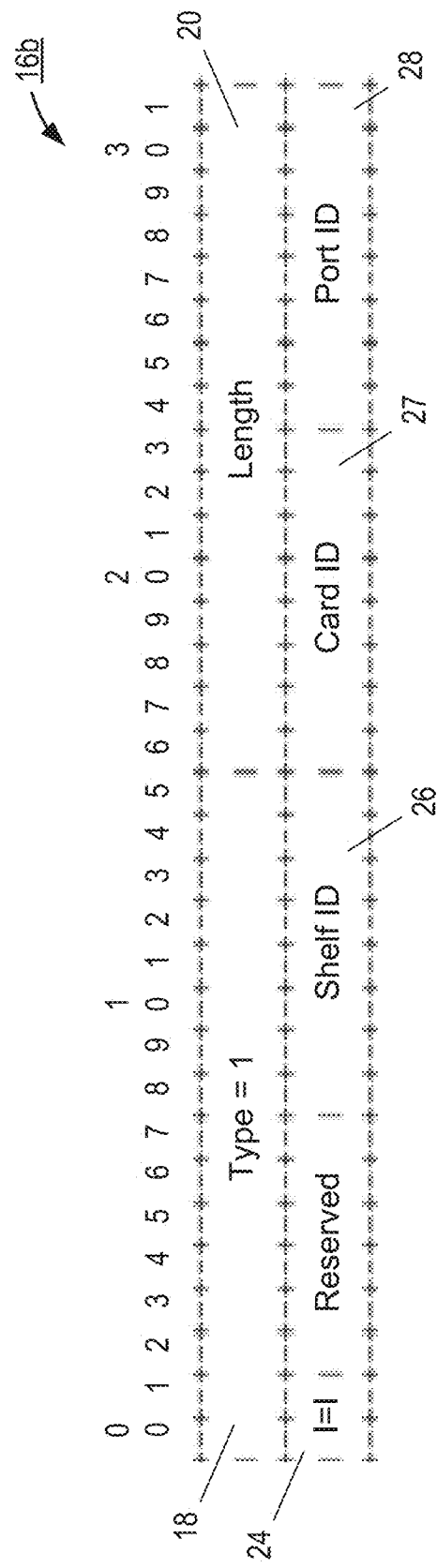

In one example, the trigger message has a TLV format, as illustrated in FIGS. 4a and 4b. The trigger message 16 thus includes a type indication 18, a length indication 20 and a value 22. As discussed above, the trigger message also includes a flag I 24. In the example message 16a of FIG. 4a, the flag 24 is cleared, and the value 22 is set to all zeros. In this example the SDN controller 10 is instructing a router to trigger auto-discovery on all of its border interfaces. In the example message 16b of FIG. 4b, the flag 24 is set, and the value 22 include three fields, each of 8 bits, indicating the Shelf ID 26, Card ID 27 and Port ID 28 of the interface on which the auto-discovery procedure is to be triggered. In the following description, it is assumed that a trigger message in the form of message 16a is sent to the router R3, and that auto-discovery on both of the router R3's border interfaces is triggered.

Figure 5:
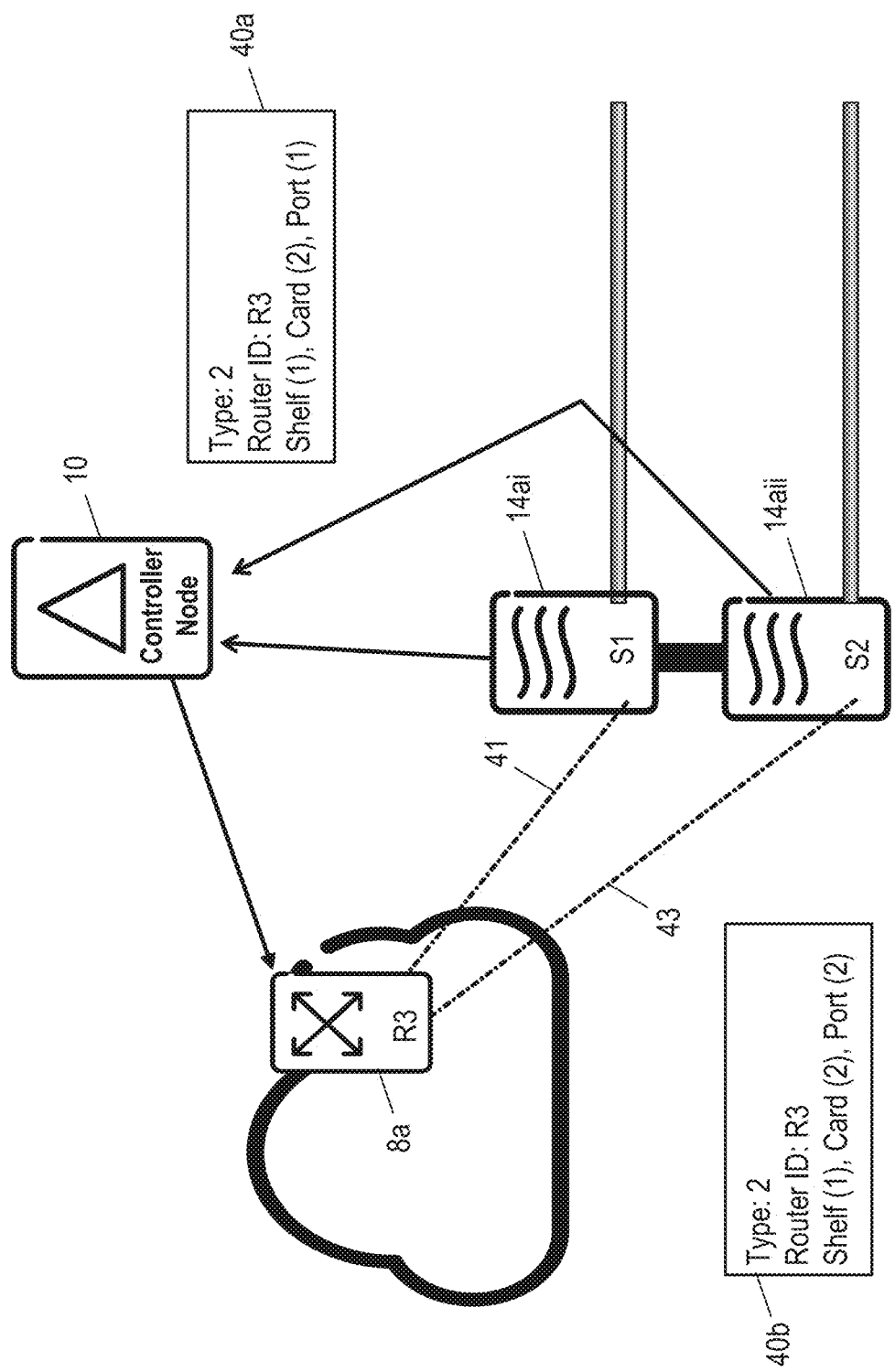
FIG. 5 illustrates another message exchange according to an example method for discovering border links.

Referring to FIG. 5, the router R3 8a then sends an in-band control message 40, also referred to as an ML-BLDP Type 2 message 40, to each of the ROADMs S1, S2 14ai 14aii, to which it is connected. The in-band control messages 40 are sent over in-band control channels 41, 43 established between the router R3 and ROADMs S1, S2 as described above and in PCT/EP2013/069571. Each in-band control message 40 identifies the router 8a's own identity R3 as well as the address of the interface over which the in-band control message is sent. In the illustrated example, the in-band control message 40a to ROADM S1 thus identifies Shelf (1), Card (2), Port (1), while the in-band control message 40b to ROADM S2 identifies Shelf (1), Card (2), Port (2).

Figure 6:
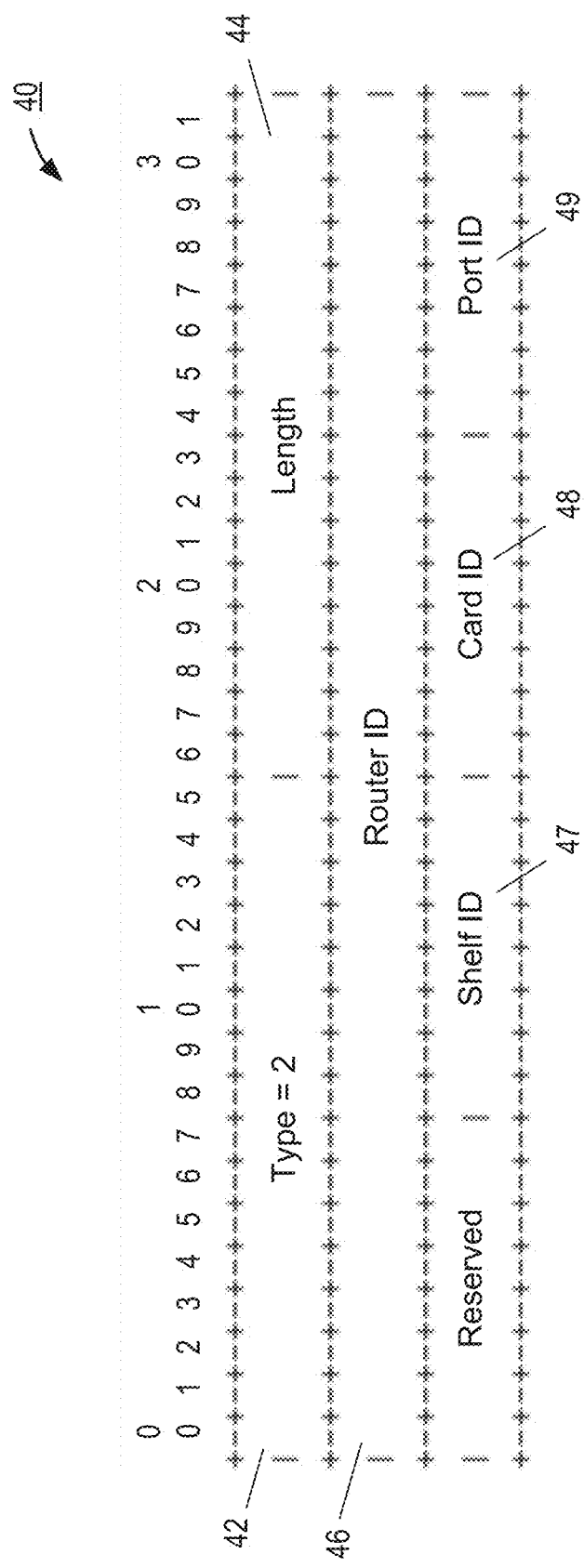
FIG. 6 illustrates another example message format.

In one example, the in-band control message 40 may also have a TLV format, as illustrated in FIG. 6, including a type indication 42, a length indication 44 and a value. The value includes the router ID 46 and three fields, each of 8 bits, indicating the Shelf ID 47, Card ID 48 and Port ID 49 of the interface on which the in-band control message 40 is sent. The router ID may be the IP address of the router or any other identity used in the communication network.

Figure 7:
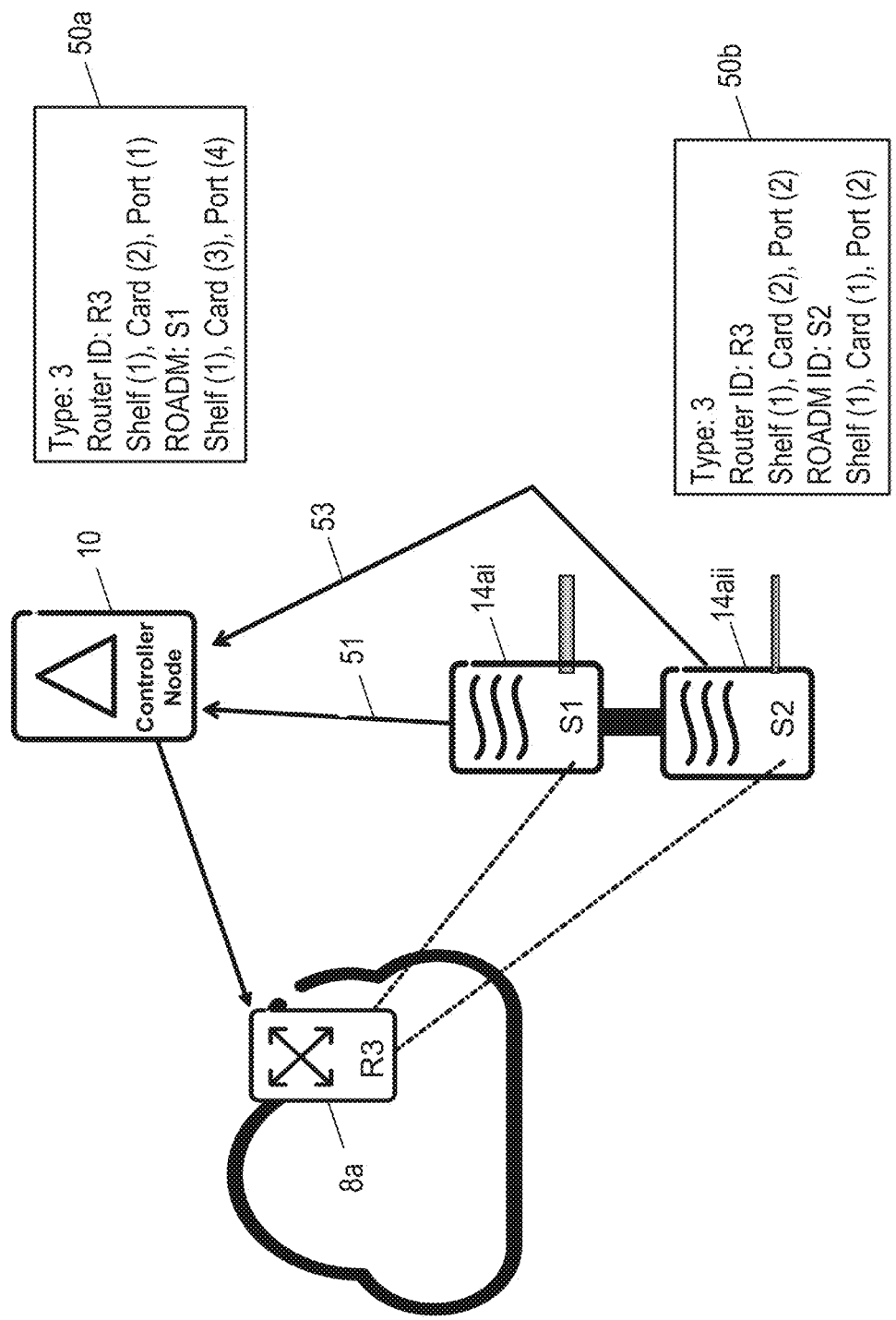
FIG. 7 illustrates another message exchange according to an example method for discovering border links.

Referring to FIG. 7, on receipt of the in-band control message 40, each ROADM 14ai, 14aii, at which the presently described protocol is configured, sends a link message 50, also referred to as an ML-BLDP Type 3 message 50, to the SDN controller 10. The link messages 50 are sent over control channels 51, 53 between the ROADMs 14ai, 14aii and the SDN controller 10. Each link message 50 replicates the in-band control message 40 received by the ROADM and also includes the interface at the ROADM on which the in-band control message 40 was received. In the illustrated example, the link message 50a from ROADM S1 thus identifies router R3 and router interface address Shelf (1), Card (2), Port (1) on which the in-band control message 40a was sent; this is the information included in the in-band control message 40a received by ROADM S1. The link message 50a also includes the ROADM's own identity S1 and the ROADM interface address Shelf (1), Card (3), Port (4) on which the in-band control message 40a was received. The link message 50b from ROADM S2 identifies router R3 and router interface address Shelf (1), Card (2), Port (2) on which the in-band control message 40b was sent; this is the information included in the in-band control message 40b received by ROADM S2. The link message 50b also includes the ROADM's own identity S2 and the ROADM interface address Shelf (1), Card (1), Port (2) on which the in-band control message 40b was received.

In one example, the link message 50 may also include a flag to signal a link failure to the SDN controller 10. When the flag is cleared the link message 50 merely reports the results of auto-discovery, identifying the interfaces of the border link between the relevant router and ROADM. When the flag is set, the link message becomes a modified link message and is used to report failure of a previously discovered border link to the SDN controller 10. This process is described in further detail below with reference to FIGS. 11 to 13.

Figure 8:
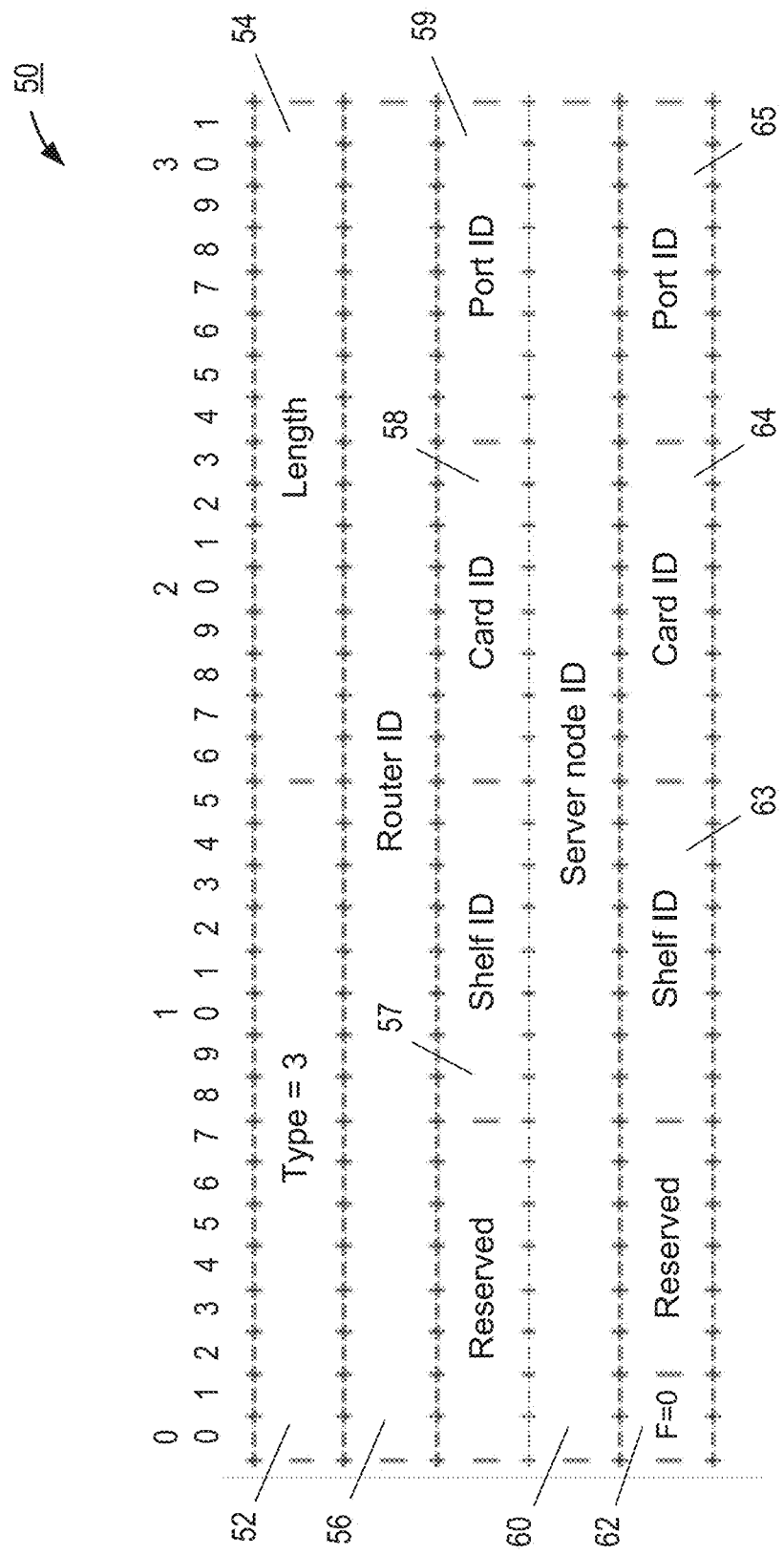
FIG. 8 illustrates another example message format.

In one example, the link message 40 may also have a TLV format, as illustrated in FIG. 8, including a type indication 52, a length indication 54 and a value. The value includes the router ID 56 and three fields, each of 8 bits, indicating the Shelf ID 57, Card ID 58 and Port ID 59 of the router interface on which the in-band control message 40 was sent. The value also includes the ROADM ID 60, flag 62 and three fields, each of 8 bits, indicating the Shelf ID 63, Card ID 64 and Port ID 65 of the ROADM interface on which the in-band control message 40 was received.

On receipt of the link message 50 from each of the ROADMs S1 and S2, the SDN controller may populate a database with records of each of the links discovered. Each link record may include the identities of the two nodes between which the link exists and the addresses of the interfaces comprising the end points of the link.

Figure 9:
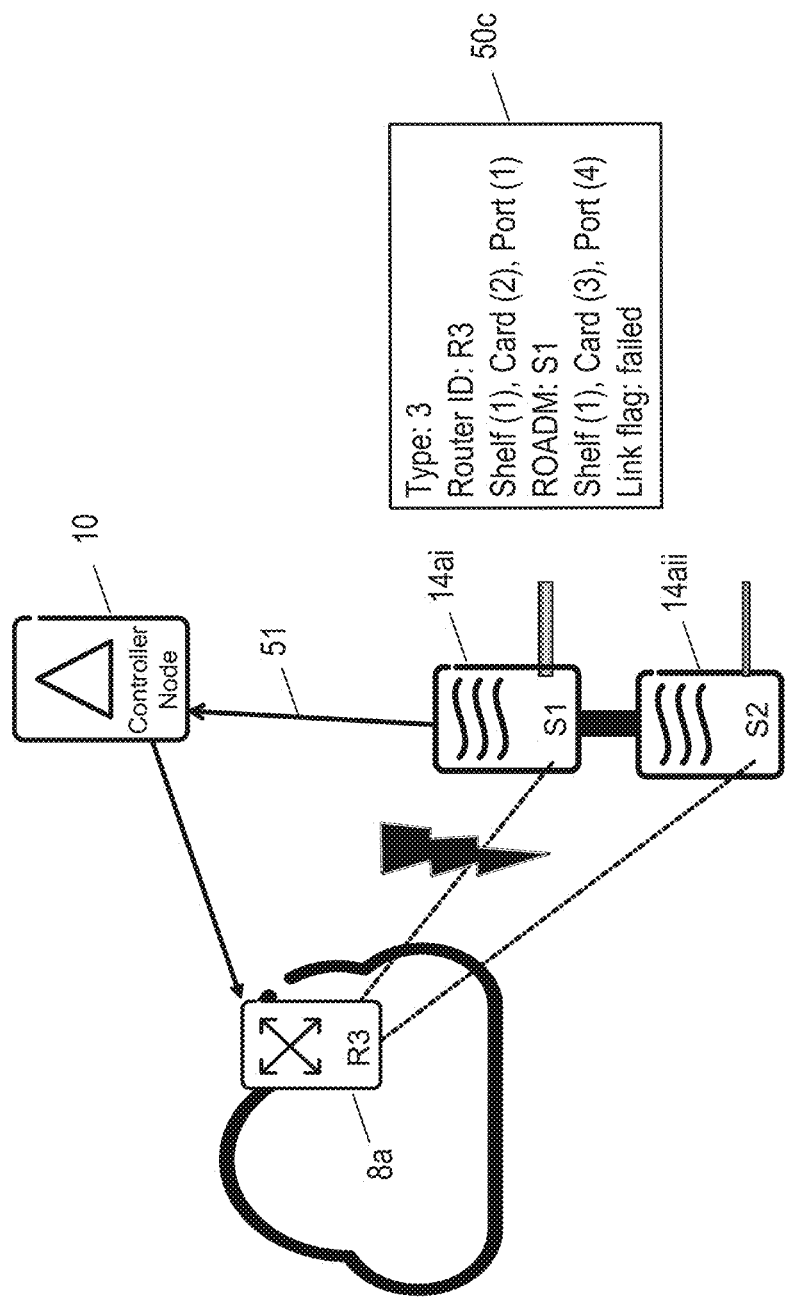
FIG. 9 illustrates another message exchange according to an example method for discovering border links.
Figure 10:
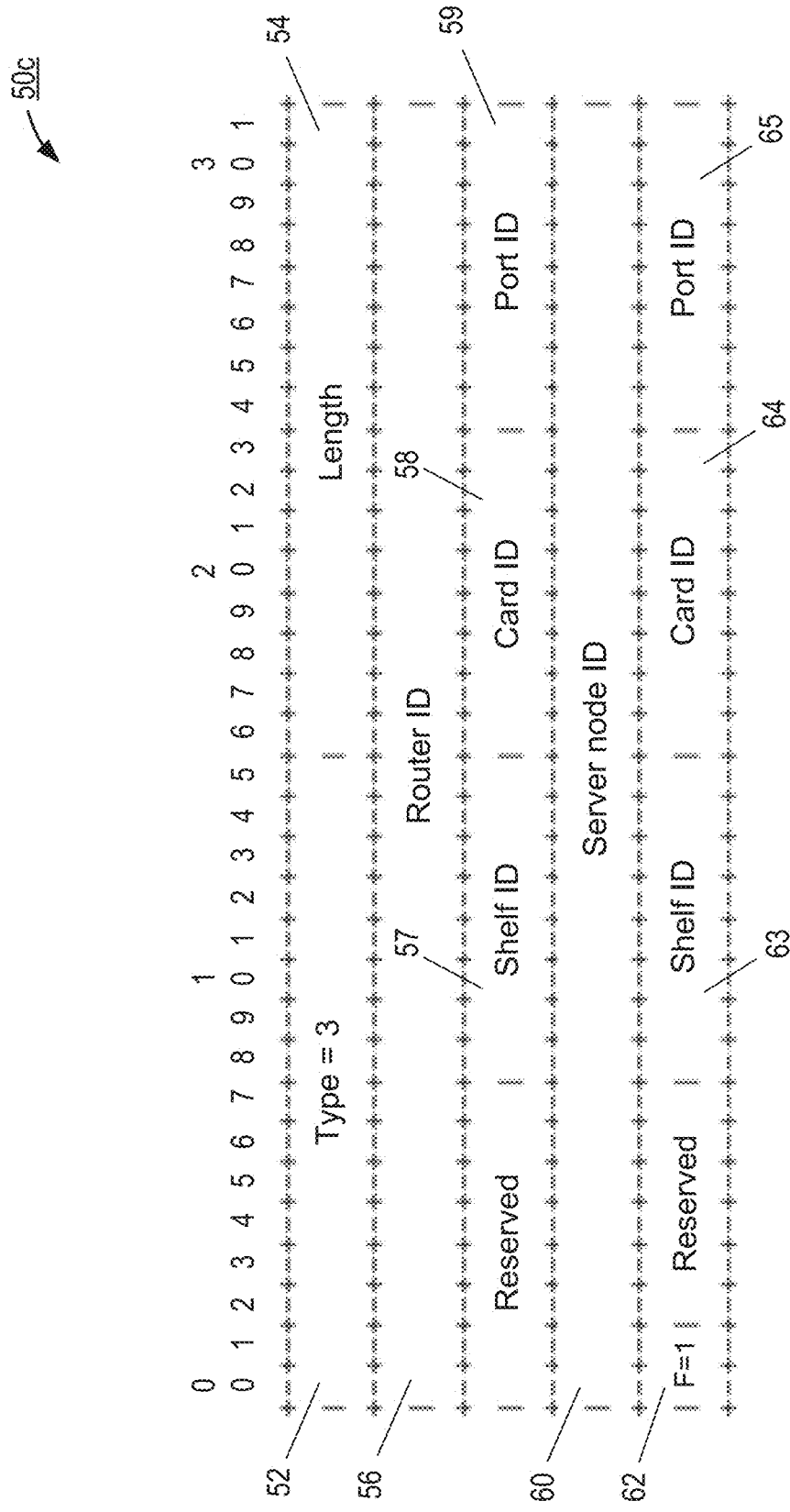
FIG. 10 illustrates another example message format.

FIG. 9 illustrates failure of a previously discovered link between the router R3 and ROADM S1. Failure of the link may be identified by the ROADM S1 for example if an in-band control message 40 is not received at an expected time, as discussed in further detail below. In the event of failure, the ROADM S1 sends the modified link message 50c over the channel 51. The modified link message 50c is illustrated in FIG. 10 and includes all of the information of the link message 50, and has the flag 62 set, indicating that failure of the specified link is being reported.

Figure 11:
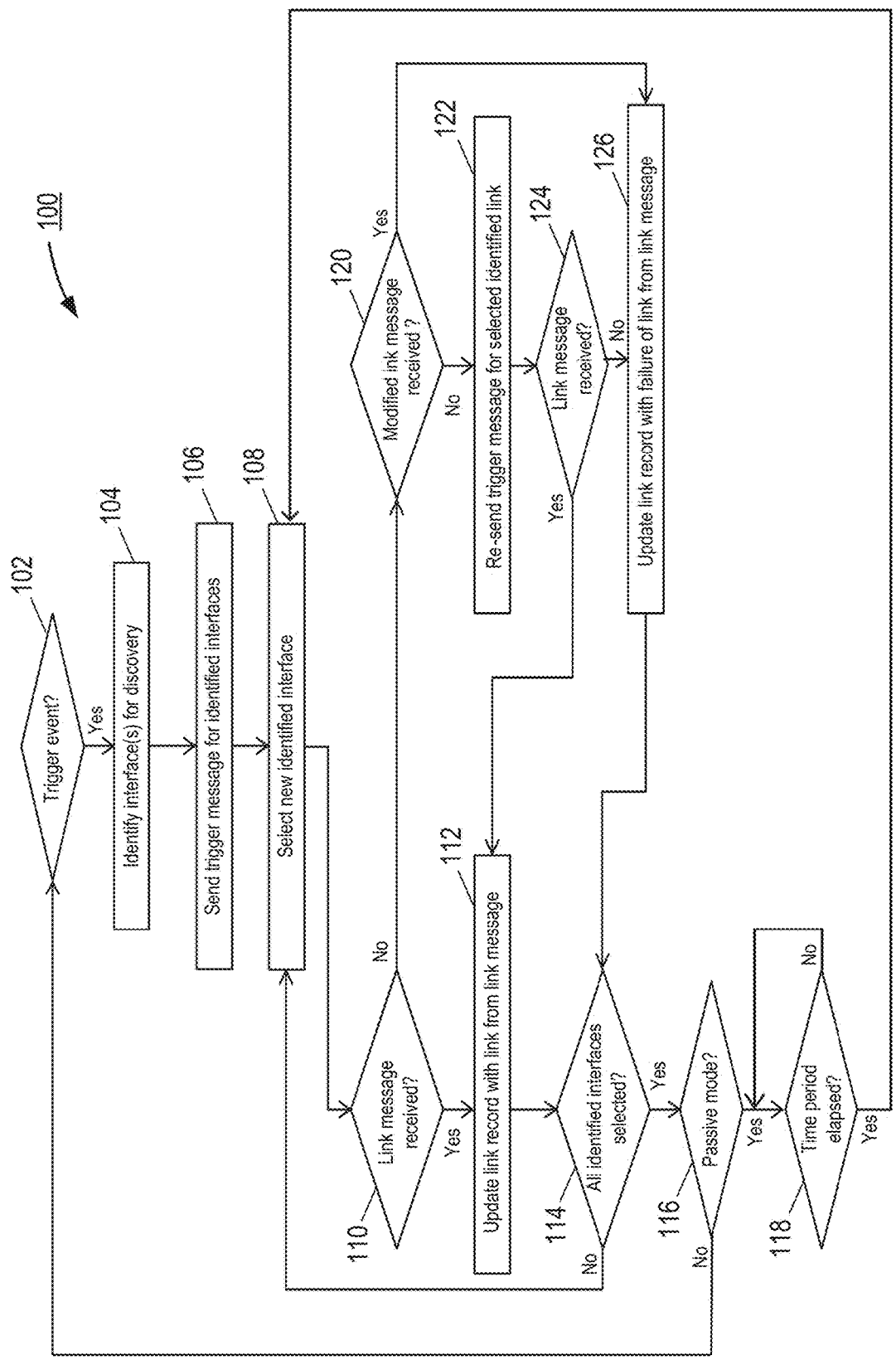
FIG. 11 is a flow chart illustrating process steps in a method for discovering border links.
Figure 12:
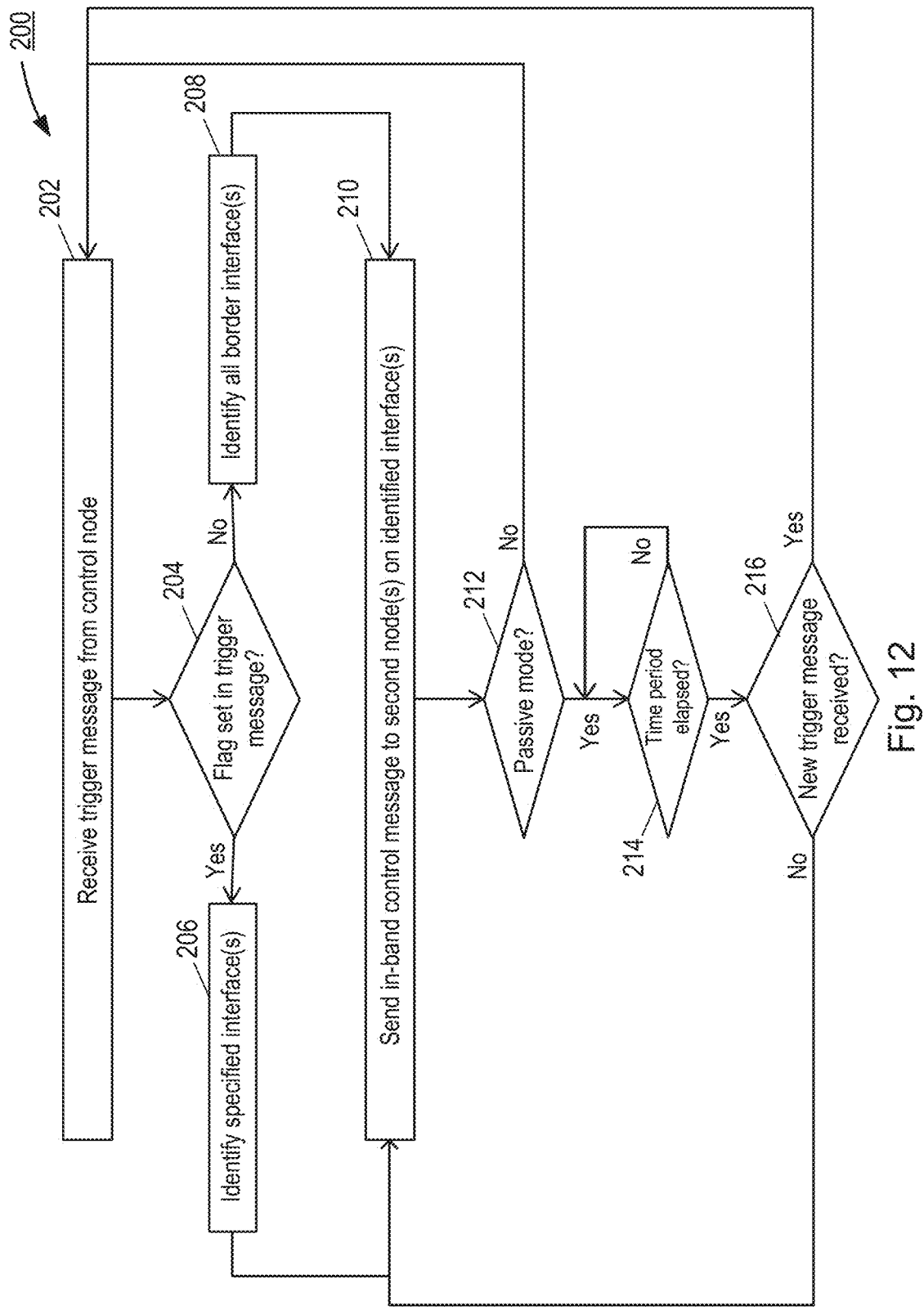
FIG. 12 is a flow chart illustrating process steps in another method for discovering border links.
Figure 13:
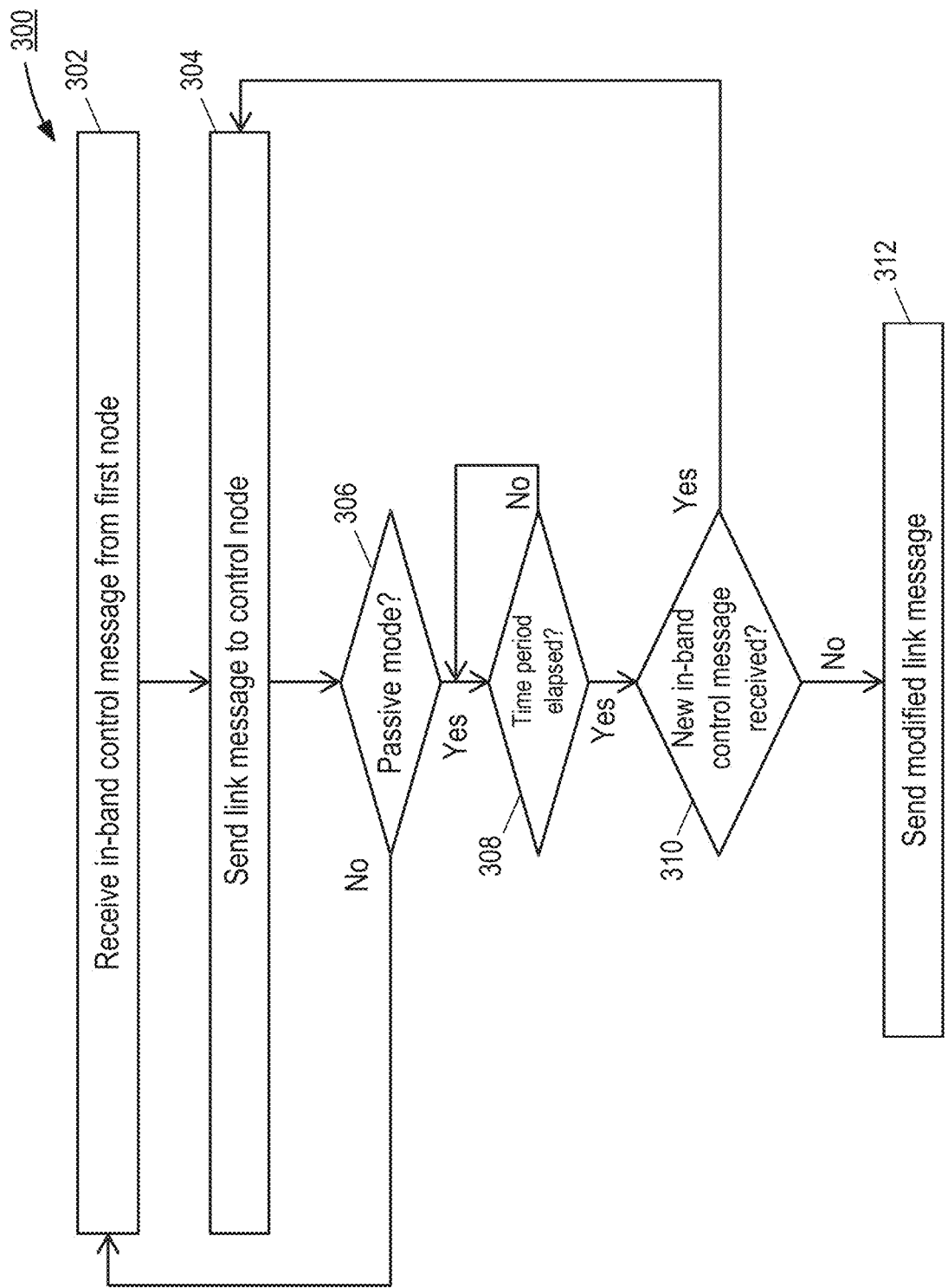
FIG. 13 is a flow chart illustrating process steps in another method for discovering border links.

The above described protocol is implemented via methods running on each of the nodes involved. FIGS. 11 to 13 illustrate example methods implementing the above described protocol according to aspects of the present invention. The methods take place at a control node, which may be as an SDN controller, a first node, which may be a packet client node such as a router, and a second node, which may be an optical node.

FIG. 11 illustrates process steps in a method 100 performed at a control node. The method 100 illustrates one example of how an aspect of the present invention may be implemented. Referring to FIG. 11, in a first step 102, the control node checks for occurrence of a trigger event. The trigger event may for example be network set up or an update in network topology. Alternatively, the trigger event may simply be a timer, according to which the control node triggers auto-discovery of border links between domains of the communication network in which is it located. On occurrence of the trigger event, the control node proceeds at step 104 to identify interfaces for discovery. This may comprise identifying one or more first nodes which are border nodes in a first domain of the communication network, and one or more interfaces on the identified first nodes, which are border interfaces. On initial network set up or following changes to network topology, the control node may elect to trigger auto-discovery on all border interfaces of all first nodes. Alternatively, in some circumstances, the control node may elect to trigger auto-discovery on only one or some first nodes, and/or on only one or some border interfaces of the selected first nodes. Having identified the interfaces for discovery, the control node then sends a trigger message for those interfaces at step 106. This may involve sending a Type 1 ML-BLDP message as discussed above to all first nodes having an interface on which auto-discovery is to be triggered. As discussed above, the trigger message may specify particular interfaces for the or each first node or may indicate that the protocol should be run for all border interfaces of the node. In some examples, a flag may be used to indicate whether the trigger message is specific to certain interfaces or not. In other examples, the absence of one or more interface addresses may be taken by the first node to mean that the message applies to all of the node's border interfaces. The trigger message may also specify whether an active or passive protocol should be followed. Alternatively, instructions concerning the use of an active or passive protocol may be pre-configured into the control node and first and second nodes. According to a passive protocol, first nodes receiving a trigger message may continue to send in-band control messages periodically, with the control node expecting to receive corresponding link messages each time a periodic in-band control message is sent. According to an active protocol, first nodes may only send an in-band control message on receipt of a suitable trigger message, and hence a new trigger message is required before a first node will send a new in-band control message. Active and passive protocols are discussed in further detail below.

Following the sending of the trigger message or messages, the methods 200, 300, illustrated in FIGS. 12 and 13, are carried out in the relevant first and second nodes, as discussed in detail below. Briefly, this involves receipt by a first node of the rigger message and consequent sending of one or more in-band control messages on the indicated interfaces. These in-band control messages are received by second nodes, which send corresponding link messages to the control node, identifying both the first node interface on which the in-band control message was sent, and the second node interface on which the in-band control message was received.

After sending the trigger message or messages, the control node thus proceeds to check for receipt of link messages from one or more second nodes. In step 108, the control node selects a new identified interface. This is one of the interfaces that was identified at step 104 for auto-discovery, and which was specified in a trigger message sent at step 106. Having selected a new identified interface, the control node checks whether or not a link message has been received identifying that interface in step 110. If a link message specifying the interface has been received, then an in-band control message has been successfully sent from that interface and received by a second node. The control node thus updates a link record with the details of the link from the link message in step 112. These details include the address of the selected interface and the identity of the first node on which the interface is located, the identity of the second node that received the in-band control message sent on the selected interface and the address of the interface on the second node at which the in-band control message was received. The link record thus includes the end point addresses of the border link between the first and second nodes.

If a link message has not been received for the selected interface (No at step 110), the control node then checks whether or not a modified link message has been received at step 120. As discussed above, a modified link message is a link message in which a failure of an identified link is reported. If a modified link message has been received, then the control node proceeds to update a link record with failure of the link specified in the link message at step 126. If a modified link message has not been received, then the control node re-sends a trigger message for the selected identified interface at step 122 and checks for receipt of a link message at step 124. Failure to receive any kind of link message may suggest that there is a problem on the link between the first and second nodes, meaning the second node did not receive the in-band control message sent by the first node in response to the trigger message, and so was not prompted to send a link message. If a link message specifying the selected identified interface is received at step 124 then the control node proceeds to update the link record accordingly at step 112. If a link message is still not received for the selected identified interface, then the control node concludes that there is a failure on the link having an end point at the selected identified interface and updates the link record accordingly at step 126. In another example, (not shown), the control node may check whether or not the link on the selected interface has already been discovered previously, before concluding link failure at step 126. If the link has not previously been discovered, and the present attempt is thus the first attempt to discover the link, then the control node may conclude that the link is simply not connected, as opposed to having failed, and may update the link record accordingly. However, if the link has previously been successfully discovered then the control node may proceed with concluding link failure, and updating the link record accordingly at step 126.

Following update of the link record in step 112 or 126, the control node then checks whether all of the interfaces identified at step 104 have been selected, that is the control node verifies whether it has checked for receipt of a link message relating to each of the interfaces specified in trigger messages sent in step 106. If all identified interfaces have not yet been selected, then the control node returns to step 108, selects a new identified interface and follows the subsequent procedure to check for receipt of a link message an update a link record. Once all identified interfaces have been selected, the control node then checks, at step 116, whether a passive mode of the auto-discovery protocol is running. As discussed above, passive mode involves a periodic sending by first nodes of an in-band control message following receipt of an initial trigger message. If passive mode is not running, then the control node returns to step 102 to await a new trigger event which will trigger the control node to re-start the auto-discovery procedure. If passive mode is running, then the first node or nodes will be re-sending their in-band control messages at periodic intervals. The control node thus waits for the appropriate time period to elapse at step 118, and when the appropriate time period has elapsed, the control node returns to step 108 and restarts the procedure of checking for link messages corresponding to each identified interface.

FIG. 12 illustrates process steps in a method 200 performed at a first node, which may be a border node such as a router. As in the case of FIG. 11, the method 200 illustrates one example of how an aspect of the present invention may be implemented. Referring to FIG. 12, in a first step 202, the first node receives a trigger message from a control node. In the illustrated example, a flag is used in the trigger message to specify whether the trigger message applies to all border interfaces on the first node or only to specific border interfaces. The first node thus checks, at step 204, whether the flag is set in the trigger message. If the flag is set, then the first node identifies the interface or interfaces specified in the trigger message at step 206. If the flag is cleared, then the first node identifies all of its border interfaces in step 208. Following interface identification in step 206 or 208, the first node then sends an in-band control message to a second node or second nodes on the identified interface or interfaces. The in-band control message or messages may be sent in accordance with the procedures explained above; each in-band control message including the identity of the first node and the address of the interface on which the message is sent. After sending the in-band control message or messages, the first node checks in step 212 whether passive mode is running. If passive more is not running, then the first node returns to step 202 and awaits receipt of a new trigger message. If passive mode is running, then the first node checks whether the appropriate time period has elapsed in step 214. Once the time period has elapsed, the first node makes an additional check as to whether a new trigger message has been received in step 216, which might override the passive procedure. If a new trigger message has been received then the first node returns to step 204 and processes the trigger message as discussed above. If no new trigger message has been received then the first node continues the passive mode by returning to step 210 and re-sending the in-band control message or messages. It will be appreciated that in some examples the steps of checking whether the time period has elapsed and checking for receipt of a new trigger message may be performed in a different order.

FIG. 13 illustrates process steps in a method 300 performed at a second node, which may be an optical node. As in the case of FIGS. 11 and 12, the method 300 illustrates one example of how an aspect of the present invention may be implemented. Referring to FIG. 13, in a first step 302 the second node receives an in-band control message from a first node with which it has a link. In step 304, the second node sends a link message to a control node. As discussed above, the link message includes the information from the received in-band control message together with the second node's own identity and the address of the interface on which the in-band control message was received. The second node then checks whether passive mode is running in step 306. If passive mode is not running then the second node returns to step 302 and awaits the arrival of a new in-band control message. If passive mode is running then the second node checks, at step 308, whether the appropriate time period has elapsed. Once the time period has elapsed, the second node checks in step 310 for receipt of the same in-band control message, which in passive mode will be resent by the first node periodically. If the in-band control message has been received as expected, then the second node returns to step 304 and sends another link message to the control node. If the in-band control message has not been received as expected, then the second node sends a modified link message to the control node, indicating that the previously reported link has failed. It will be appreciated that in some examples the second node may wait for multiple time periods before assuming link failure and sending the modified link message. The second node may for example wait for two, three or more missed in-band control messages before sending the modified link message in step 312.

Figure 14:
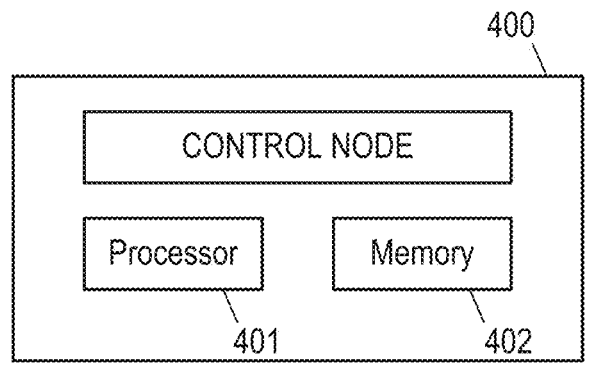
FIG. 14 is a block diagram illustrating functional units in a control node.
Figure 15:
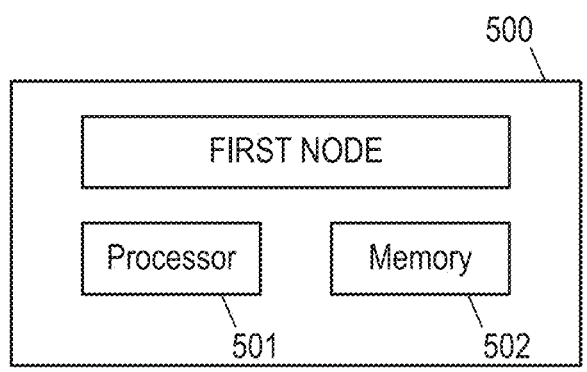
FIG. 15 is a block diagram illustrating functional units in a first node.
Figure 16:
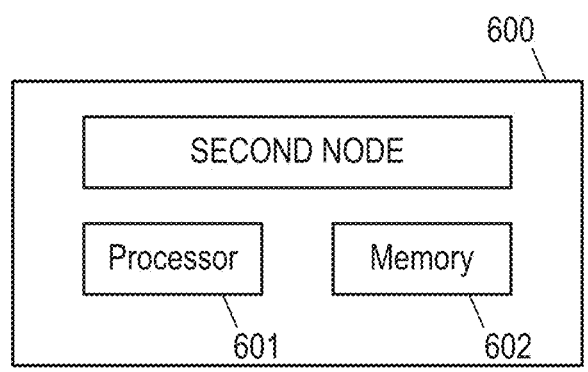
FIG. 16 is a block diagram illustrating functional units in a second node.

FIGS. 14 to 16 illustrate examples of a control node 400, first node 500 and second node 600 which may execute the methods of the present invention, for example on receipt of suitable instructions from a computer program. Referring to FIGS. 14 to 16, each of the control node 400, first node 500 and second node 600 comprises a processor 401, 501, 601 and a memory 402, 502, 602. Each memory 402, 502, 602 contains instructions executable by the corresponding processor 401, 501, 601 such that the control node is operable to carry out examples of the method 100, the first node is operable to carry out examples of the method 200 and the second node is operable to carry out examples of the method 300.

Figure 17:
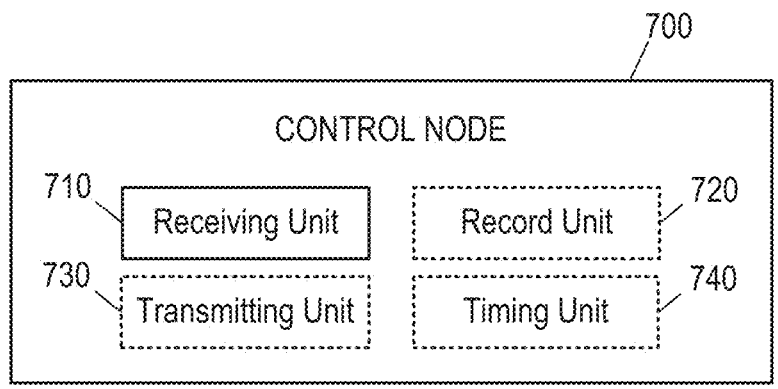
FIG. 17 is a block diagram illustrating functional units in another example of control node.

FIG. 17 illustrates functional units in another example of control node 700, which may execute a method of automatically discovering links between a first node of a first operating domain and a second node of a second operating domain of a communication network. The method may be performed for example according to computer readable instructions received from a computer program. It will be understood that the units illustrated in FIG. 17 are functional units, and may be realised in any appropriate combination of hardware and/or software.

Referring to FIG. 17, the control node 700 comprises a receiving unit 710 configured to receive a link message from the second node, the link message comprising information about the first node and a first interface used by the first node for sending an in-band control message to the second node, and information about a second interface used by the second node for receiving the in-band control message.

The control node 700 may also comprise a record unit 720 configured to update a link record with the link between the first interface of the first node and the second interface of the second node. The control node 700 may also comprise a transmitting unit 730 configured to send a trigger message to the first node, the trigger message instructing the first node to send the in-band control message. The trigger message may indicate an interface of the first node to be used for sending the in-band control message and may instruct the first node to send the in-band control message periodically.

The control node 700 may also comprise a timing unit 740 configured to check for receipt from a second node of a link message corresponding to the trigger message, and, on failure to receive from the second node a link message corresponding to the trigger message, to cause the transmitting unit to resend the trigger message. The timing unit may also be configured to check for receipt of a link message from the second node corresponding to the re-sent trigger message and, on failure to receive such a message, to cause the record unit 720 to update a link record with failure of the link between the first node and the second node corresponding to the re-sent trigger message.

The receiving unit 710 may be further configured to receive a modified link message from the second node, the modified link message indicating failure of the link between the first node and the second node. The record unit 720 may be configured to update a link record with failure of the link between the first node and the second node.

Figure 18:
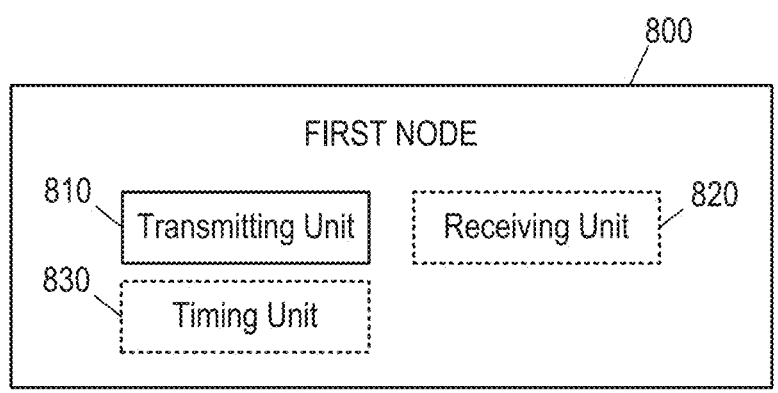
FIG. 18 is a block diagram illustrating functional units in another example of first node.

FIG. 18 illustrates functional units in another example of first node 800, which may execute a method of automatically discovering links between the first node, which is in a first operating domain of a communication network, and a second node of a second operating domain of the communication network. The method may be performed for example according to computer readable instructions received from a computer program. It will be understood that the units illustrated in FIG. 18 are functional units, and may be realised in any appropriate combination of hardware and/or software. the first node 800 may for example be a packet client node.

Referring to FIG. 18, the first node 800 comprises a transmitting unit 810 configured to send an in-band control message to the second node, the in-band control message being encoded using size of packets of the control message and providing information about the first node and a first interface used by the first node for sending the control message. The first node 800 may also comprise a receiving unit 820 configured to receive a trigger message from a control node, the trigger message instructing the first node to send the in-band control message. The trigger message may also indicate an interface of the first node to be used for sending the in-band control message and the transmitting unit 810 may be configured to send the in-band control message to the second node using the indicated interface. The transmitting unit 810 may further be configured to send the in-band control message to the second node periodically.

Figure 19:
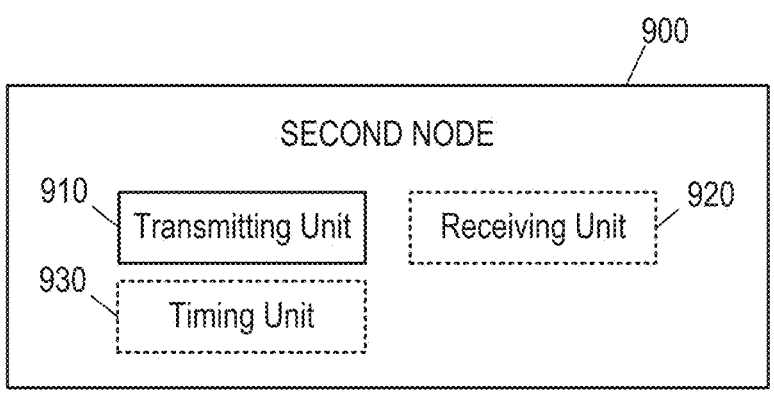
FIG. 19 is a block diagram illustrating functional units in another example of second node.

FIG. 19 illustrates functional units in another example of second node 900, which may execute a method of automatically discovering links between a first node of a first operating domain of a communication network, and the second node, which is in a second operating domain of the communication network. The method may be performed for example according to computer readable instructions received from a computer program. It will be understood that the units illustrated in FIG. 19 are functional units, and may be realised in any appropriate combination of hardware and/or software. The second node 900 may for example be an optical node.

Referring to FIG. 19, the second node 900 comprises a receiving unit 910 configured to receive an in-band control message from the first node, the in-band control message being encoded using size of packets of the control message and providing information about the first node and a first interface used by the first node for sending the control message. The second node 900 further comprises a transmitting unit 920 configured to send a link message to a control node, the link message comprising information received in the in-band control message and information about a second interface used by the second node for receiving the in-band control message.

The in-band control message may be received by the second node periodically and the second node 900 may further comprise a timing unit 930 configured, if the second node fails to receive the in-band control message, to cause the transmitting unit 920 to send a modified link message to the control node, the modified link message indicating failure of the link between the first node and the second node.

Aspects of the present invention thus provide a method for the automatic discovery of links between non homogeneous network domains, including for example packet and optical domains, in a multilayer environment, which may be an SDN environment. Examples of the present invention provide light messages and procedures which may be used in links between router interfaces and transponder client interfaces, at which it is not possible to run any complex routing protocol as transponders are unable to process packets. Examples of the invention make use of methods for establishing an in-band control channel as defined in PCT/EP2013/069571.

Examples of methods according to the present invention allow for the automatic population and update of a multilayer topology database. Without such procedures, network operators are obliged to insert the border links into a topology database manually, and to implement a polling mechanism that periodically queries the status of the interfaces so to check the status of each link. Aspects of the present invention thus reduce operational expenditure for network configuration and also enable detection of configuration mistakes which otherwise are extremely difficult to detect and require in field intervention to correct.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of automatically discovering links between a first node of a first operating domain and a second node of a second operating domain of a communication network, the method performed in the second node and the method comprising:

receiving, from the first node, an in-band control message, wherein the in-band control message is sent by the first node in response to reception of a trigger message, the trigger message instructing the first node to send the in-band control message to the second node over a link, and comprising a flag indicating to the first node whether the trigger message applies to all border interfaces on the first node, or to selected border interfaces on the first node, wherein the in-band control message comprises information about the first node and a first interface used by the first node for sending the in-band control message, and wherein a size of packets of the in-band control message is used to encode the in-band control message;

sending a link message to a control node, the link message comprising information received in the in-band control message and information about a second interface used by the second node for receiving the in-band control message;

wherein the in-band control message is received by the second node periodically, and if the second node fails to receive the in-band control message;

sending a modified link message to the control node, the modified link message indicating failure of the link between the first node and the second node.

2. The method of claim 1, wherein the first node comprises a packet client node and the second node comprises an optical node.

3. A method of automatically discovering links between a first node of a first operating domain and a second node of a second operating domain of a communication network, the method performed in a control node and the method comprising:

sending a trigger message to the first node, the trigger message instructing the first node to send an in-band control message to the second node over a link, and comprising a first flag indicating to the first node whether the trigger message applies to all border interfaces on the first node, or to selected border interfaces on the first node;

if the link between the first and second nodes has not failed, receiving a link message from the second node, the link message comprising:
    information about the first node and a first interface used by the first node for sending the in-band control message to the second node; and
    information about a second interface used by the second node for receiving the in-band control message;

if the link between the first and second nodes has failed, receiving a modified link message from the second node, the modified link message comprising:
    the information about the first node and the first interface used by the first node for sending the in-band control message to the second node;
    the information about the second interface used by the second node for receiving the in-band control message; and
    a second flag set to indicate that the link between the first and second nodes has failed; and wherein the trigger message is a different message than the in-band control message.

4. The method of claim 3, further comprising updating a link record with the link between the first interface of the first node and the second interface of the second node.

5. The method of claim 3, wherein the trigger message indicates an interface of the first node to be used for sending the in-band control message.

6. The method of claim 3, wherein the trigger message instructs the first node to send the in-band control message periodically.

7. The method of claim 3, further comprising:
    checking for a receipt, from a second node, of the link message corresponding to the trigger message; and
    resending the trigger message if the link message is not received.

8. The method of claim 7, further comprising updating a link record with failure of the link between the first node and the second node corresponding to the re-sent trigger message.

9. The method of claim 5, further comprising updating a link record with failure of the link between the first node and the second node.

10. A computer program product stored in a non-transitory computer readable medium for automatically discovering links between a first node of a first operating domain and a second node of a second operating domain of a communication network, the computer program product comprising software instructions which, when run on one or more processing circuits of the second node, cause the second node to:
    receive, from the first node, an in-band control message, wherein the in-band control message is sent by the first node in response to reception of a trigger message, the trigger message instructing the first node to send the in-band control message to the second node over a link, and comprising a flag indicating to the first node whether the trigger message applies to all border interfaces on the first node, or to selected border interfaces on the first node, wherein the in-band control message comprises information about the first node and a first interface used by the first node for sending the in-band control message, and wherein a size of packets of the in-band control message is used to encode the in-band control message; and
    send a link message to a control node, the link message comprising information received in the in-band control message and information about a second interface used by the second node for receiving the in-band control message;
    wherein the in-band control message is received by the second node periodically, and if the second node fails to receive the in-band control message, the software instructions cause the second node to send a modified link message to the control node, the modified link message indicating failure of the link between the first node and the second node.

11. A computer program product stored in a non-transitory computer readable medium for automatically discovering links between a first node of a first operating domain and a second node of a second operating domain of a communication network, the computer program product comprising software instructions which, when run on one or more processing circuits of a control node, cause the control node to:
    send a trigger message to the first node, the trigger message instructing the first node to send an in-band control message to the second node over a link, and comprising a first flag indicating to the first node whether the trigger message applies to all border interfaces on the first node, or to selected border interfaces on the first node;
    if the link between the first and second nodes has not failed, receive a link message from the second node, the link message comprising:
        information about the first node and a first interface used by the first node for sending the in-band control message to the second node; and
        information about a second interface used by the second node for receiving the in-band control message;
    if the link between the first and second nodes has failed, receive a modified link message from the second node, the modified link message comprising:
        the information about the first node and the first interface used by the first node for sending the in-band control message to the second node;
        the information about the second interface used by the second node for receiving the in-band control message;
        a second flag set to indicate that the link between the first and second nodes has failed; and
    wherein the trigger message is a different message than the in-band control message.

12. A control node configured to automatically discover links between a first node of a first operating domain and a second node of a second operating domain of a communication network, the control node comprising:
    a processing circuit; and
    memory comprising instructions executable by the processing circuit to cause the control node to:
        send a trigger message to the first node, the trigger message instructing the first node to send an in-band control message to the second node over a link, and comprising a first flag indicating to the first node whether the trigger message applies to all border interfaces on the first node, or to selected border interfaces on the first node;

if the link between the first and second nodes has not failed, receive a link message from the second node, the link message comprising:
  information about the first node and a first interface used by the first node for sending the in-band control message to the second node; and
  information about a second interface used by the second node for receiving the in-band control message;
if the link between the first and second nodes has failed, receive a modified link message from the second node, the modified link message comprising:
  the information about the first node and the first interface used by the first node for sending the in-band control message to the second node;
  the information about the second interface used by the second node for receiving the in-band control message;
  a second flag set to indicate that the link between the first and second nodes has failed; and
wherein the trigger message is a different message than the in-band control message.

13. The control node of claim 12, wherein the control node is further configured to update a link record with the link between the first interface of the first node and the second interface of the second node.

14. A second node of a second operating domain of a communication network, configured to automatically discover links between the second node and a first node of a first operating domain of the communication network, the second node comprising:
  a processing circuit; and
  memory comprising instructions executable by the processing circuit to cause the second node to:
    receive, from the first node, an in-band control message, wherein the in-band control message is sent by the first node in response to reception of a trigger message, the trigger message instructing the first node to send the in-band control message to the second node over a link, and comprising a flag indicating to the first node whether the trigger message applies to all border interfaces on the first node, or to selected border interfaces on the first node, wherein the in-band control message comprises information about the first node and a first interface used by the first node, and wherein a size of packets of the in-band control message is used to encode the in-band control message; and
    send a link message to a control node, the link message comprising information received in the in-band control message and information about a second interface used by the second node to receive the in-band control message;
  wherein the second node is configured to receive the in-band control message periodically and if the second node fails to receive the in-band control message the instructions executable by the processing circuit cause the second node to send a modified link message to the control node, the modified link message indicating failure of the link between the first node and the second node.

15. A control node configured to automatically discover links between a first node of a first operating domain and a second node of a second operating domain of a communication network, the control node comprising:
  a transmitting circuit configured to send a trigger message to the first node, the trigger message instructing the first node to send an in-band control message to the second node, and comprising a first flag indicating to the first node whether the trigger message applies to all border interfaces on the first node, or to selected border interfaces on the first node;
  a receiving circuit configured to:
    receive a link message from the second node over a link if the link between the first and second nodes has not failed, the link message comprising:
      information about the first node and a first interface used by the first node for sending the in-band control message to the second node; and
      information about a second interface used by the second node for receiving the in-band control message;
    receive a modified link message from the second node if the link between the first and second nodes has failed, the modified link message comprising:
      the information about the first node and the first interface used by the first node for sending the in-band control message to the second node;
      the information about the second interface used by the second node for receiving the in-band control message; and
      a second flag set to indicate that the link between the first and second nodes has failed; and
  wherein the trigger message is a different message than the in-band control message.

16. The control node of claim 15, further comprising a record circuit configured to update a link record with the link between the first interface of the first node and the second interface of the second node.

17. A second node of a second operating domain of a communication network, configured to automatically discover links between the second node and a first node of a first operating domain of the communication network, the second node comprising:
  a receiving circuit configured to receive, from the first node, an in-band control message, wherein the in-band control message is sent by the first node in response to reception of a trigger message, the trigger message instructing the first node to send the in-band control message to the second node over a link, and comprising a flag indicating to the first node whether the trigger message applies to all border interfaces on the first node, or to selected border interfaces on the first node, wherein the in-band control message comprises information about the first node and a first interface used by the first node for sending the in-band control message, and wherein a size of packets of the in-band control message is used to encode the in-band control message; and
  a transmitting circuit configured to send a link message to a control node, the link message comprising information received in the in-band control message and information about a second interface used by the second node for receiving the in-band control message;
  wherein the in-band control message is received by the second node periodically; and
  wherein the second node further comprises a timing circuit configured to, if the second node fails to receive the in-band control message, cause the transmitting circuit to send a modified link message to the control node, the modified link message indicating failure of the link between the first node and the second node.

* * * * *